(12) United States Patent
Matsumoto et al.

(10) Patent No.: US 12,047,114 B2
(45) Date of Patent: Jul. 23, 2024

(54) COMMUNICATION CONTROL METHOD AND COMMUNICATION CONTROL APPARATUS

(71) Applicant: NATIONAL INSTITUTE OF ADVANCED INDUSTRIAL SCIENCE AND TECHNOLOGY, Tokyo (JP)

(72) Inventors: Ryosuke Matsumoto, Tsukuba (JP); Ken-ichi Sato, Tsukuba (JP)

(73) Assignee: NATIONAL INSTITUTE OF ADVANCED INDUSTRIAL SCIENCE AND TECHNOLOGY (JP)

(*) Notice: Subject to any disclaimer, the term of this patent is extended or adjusted under 35 U.S.C. 154(b) by 166 days.

(21) Appl. No.: 17/797,635

(22) PCT Filed: Feb. 4, 2021

(86) PCT No.: PCT/JP2021/004139
§ 371 (c)(1),
(2) Date: Aug. 4, 2022

(87) PCT Pub. No.: WO2021/166665
PCT Pub. Date: Aug. 26, 2021

(65) Prior Publication Data
US 2023/0055239 A1 Feb. 23, 2023

(30) Foreign Application Priority Data
Feb. 17, 2020 (JP) ................................. 2020-024329

(51) Int. Cl.
*H04B 10/075* (2013.01)
*H04B 10/077* (2013.01)
(Continued)

(52) U.S. Cl.
CPC ....... *H04B 10/0771* (2013.01); *H04B 10/075* (2013.01); *H04B 10/079* (2013.01);
(Continued)

(58) Field of Classification Search
CPC ................ H04B 10/075; H04B 10/079; H04Q 11/0062; H04Q 11/0066; H04L 12/2885; H04L 49/10
See application file for complete search history.

(56) References Cited

U.S. PATENT DOCUMENTS 6,058,227 A 5/2000 Wong ............................... 385/16
8,483,096 B2 * 7/2013 Vahdat .................... H04L 45/00
370/395.31

(Continued)

FOREIGN PATENT DOCUMENTS

CN 103748818 A 4/2014
CN 106851442 A * 6/2017 ......... H04Q 11/0005
(Continued)

OTHER PUBLICATIONS

International Search Report mailed Apr. 20, 2021 in corresponding PCT International Application No. PCT/JP2021/004139.
(Continued)

*Primary Examiner* — Li Liu
(74) *Attorney, Agent, or Firm* — OSTROLENK FABER LLP

(57) ABSTRACT

Provided is a communication control method of controlling communication between a first electrical switch and a second electrical switch each connected via an optical network and via an electrical network and each responsible for one or more devices to enable a data transfer with high reliability and low latency. The communication control method includes processes of (A) determining the presence or absence of blocking in relation to a first setup request of an
(Continued)

optical circuit from the first electrical switch to the second electrical switch and (B) performing, if the blocking is present, at least one process of a first process of transmitting, from the first electrical switch, a second setup request of the optical circuit from the first electrical switch to the second electrical switch and a second process of transmitting a packet or a packet flow related to the first setup request from the first electrical switch via the electrical network.

14 Claims, 15 Drawing Sheets

(51) Int. Cl.
*H04B 10/079* (2013.01)
*H04L 12/28* (2006.01)
*H04L 43/0852* (2022.01)
*H04L 49/10* (2022.01)
*H04L 49/55* (2022.01)
*H04Q 11/00* (2006.01)

(52) U.S. Cl.
CPC ...... *H04L 12/2885* (2013.01); *H04L 43/0852* (2013.01); *H04L 49/10* (2013.01); *H04L 49/557* (2013.01); *H04Q 11/0062* (2013.01); *H04Q 11/0066* (2013.01)

(56) References Cited

U.S. PATENT DOCUMENTS

| | | | | |
|---|---|---|---|---|
| 8,867,915 | B1* | 10/2014 | Vahdat | H04B 10/27 398/55 |
| 2014/0321849 | A1* | 10/2014 | Katagiri | H04J 14/0201 398/45 |
| 2015/0181317 | A1* | 6/2015 | Yin | H04J 14/0212 398/45 |
| 2016/0037240 | A1* | 2/2016 | Yang | H04Q 11/0062 398/45 |
| 2019/0053315 | A1* | 2/2019 | Yiu | H04L 1/188 |
| 2020/0220668 | A1 | 7/2020 | Guan et al. | |

FOREIGN PATENT DOCUMENTS

| | | | |
|---|---|---|---|
| CN | 106851442 | A | 6/2017 |
| CN | 107003484 | A | 8/2017 |
| CN | 106664290 | B | 12/2019 |
| JP | 2013-021677 | A | 1/2013 |
| JP | 2013021677 | A * | 1/2013 |
| JP | 2014-217002 | A | 11/2014 |

OTHER PUBLICATIONS

Arjun Singh, et al., "Jupiter Rising: A Decade of Clos Topologies and Centralized Control in Google's Datacenter Network", Proc. ACM SIGCOMM 2015 Conference (SIGCOMM ' 15), London, United Kingdom, Aug. 2015, pp. 183-197.

Nathan Farrington, et al., "Helios: A Hybrid Electrical/Optical Switch Architecture for Modular Data Centers", Proc. ACM SIGCOMM 2010 Conference (SIGCOMM ' 10), New Delhi, India, Aug. 2010, pp. 339-350.

Ken-Ichi Sato, "Realization and Application of Large-Scale Fast Optical Circuit Switch for Data Center Networking", IEEE/OSA Journal of Lightwave Technology, vol. 36, No. 7, Apr. 2018, pp. 1411-1419.

Cai Yueping et al., "Performance analysis of AWGR-based hybrid opto-electrical data center network", J.Huazhong Univ. of Sci. & Tech. (Natural Science Edition), vol. 43, No. 5, May 2015. English translation of the Abstract.

\* cited by examiner

FIG. 6

| INPUT PORT | OUTPUT PORT | | | | | |
|---|---|---|---|---|---|---|
| | 1 | 2 | 3 | · | · | Q |
| 1 | − | ○ | × | ○ | ○ | ○ |
| 2 | × | − | × | × | × | × |
| 3 | × | ○ | − | ○ | ○ | ○ |
| · | × | ○ | × | − | ○ | ○ |
| · | × | ○ | × | ○ | − | ○ |
| P | × | × | × | × | × | × |

(1) ρ=0.2, (2) ρ=0.4, (3) ρ=0.6, (4) ρ=0.8

COMMUNICATION CONTROL METHOD AND COMMUNICATION CONTROL APPARATUS

REFERENCES TO RELATED APPLICATIONS

The present application is a 35 U.S.C. § 371 national stage application of PCT/JP2021/004139, filed Feb. 4, 2021, which claims priority to Japanese Patent Application No. 2020-024329, filed Feb. 17, 2020, the contents of which are incorporated herein by reference.

TECHNICAL FIELD

The present invention relates to communication control technology for controlling communication of a hybrid electrical/optical switch network.

BACKGROUND ART

The advent of $5^{th}$ generation mobile communication systems (5G) and the Internet of Things (IoT) is spurring an increase in communication traffic within datacenters. For example, IP traffic in datacenters worldwide is expected to reach 20.6 zettabytes by 2021 and about 75% thereof is expected to be processed within datacenters. On the other hand, current intra-datacenter networks are constructed using multi-layer electrical switches (e.g., Non-Patent Literature 1) and the power consumption of large-scale datacenters reaches several tens of thousands to several hundred thousand kW. In order to handle even higher-capacity and larger-volume communication traffic, it is preferable to increase a communication bandwidth of an intra-datacenter network and reduce power consumption.

The electrical switch/router configuration has a hierarchical structure in the current intra-datacenter network and a top of rack (ToR) switch for consolidating a server computer, a storage, and the like is located at a low level. For example, Patent Literature 1 discloses examples of an intra-datacenter network configuration and a control method based on current electrical switches/routers.

In response to such datacenter demands, a hybrid electrical/optical switch network using both an electrical switch and an optical switch has been proposed (e.g., Non-Patent Literature 2). In the technology described in Non-Patent Literature 2, a traffic flow is routed from a server computer or a storage via a ToR switch and higher-level electrical and optical switches are interconnected to the ToR switch. Also, a traffic flow routed via the ToR switch or a traffic flow generated from an individual server computer or storage is monitored and a route based on an electrical switch or an optical switch is selected in accordance with a magnitude of the flow. For example, a small flow of 15 Mb/s or less is classified as a Mice flow, a large flow exceeding 15 Mb/s is classified as an Elephant flow, the Mice flow is processed in an electrical switch, and the Elephant flow is processed in an optical switch. By exchanging a large-scale flow in an optical circuit in this way, the hybrid electrical/optical switch network can process higher-capacity communication traffic with low power consumption compared to the current intra-datacenter network (i.e., a multi-layer electrical switch configuration). Also, a hybrid electrical/optical switch network capable of supporting large-scale datacenters uses a thousand-port scale optical circuit switch, and its configuration method, and the like have been proposed (e.g., Non-Patent Literature 3).

However, in a hybrid electrical/optical switch network, there is a problem that blocking occurs and a data transfer fails when an optical circuit cannot be set up between transmitting and receiving ToR switches. When connection information and a usage state of the entire network are managed in addition to traffic flow information such that this influence is minimized, there is a problem that a control mechanism is complicated and processing latency is increased. A multi-hop transfer for transmitting data to a destination receiving-side ToR switch via another unused ToR switch when blocking has occurred is also conceivable. However, in this case, a complicated control mechanism and increased processing latency become problematic.

CITATION LIST

Patent Literature

[Patent Literature 1]
U.S. Pat. No. 8,483,096

Non-Patent Literature

[Non-Patent Literature 1]
Arjun Singh et al., "Jupiter Rising: A Decade of Clos Topologies and Centralized Control in Google's Datacenter Network", Proc. ACM SIGCOMM 2015 Conference (SIGCOMM '15), pp. 88-97, London, United Kingdom, August 2015

[Non-Patent Literature 2]
Nathan Farrington et al., "Helios: A Hybrid Electrical/Optical Switch Architecture for Modular Data Centers", Proc. ACM SIGCOMM 2010 Conference (SIGCOMM '10), pp. 339-350, New Delhi, India, August 2010

[Non-Patent Literature 3]
Ken-ichi Sato, "Realization and Application of Large-Scale Fast Optical Circuit Switch for Data Center Networking", IEEE/OSA Journal of Lightwave Technology, Vol. 36, No. 7, pp. 1411-1419, April 2018

SUMMARY OF INVENTION

Technical Problem

Therefore, an objective of the present invention is to provide communication control technology for implementing a hybrid electrical/optical switch network capable of transferring data with low latency as an aspect.

Solution to Problem

According to the present invention, there is provided a communication control method of controlling communication between a first electrical switch and a second electrical switch each connected via an optical network and an electrical network and each responsible for one or more devices. The communication control method includes processes of: (A) determining the presence or absence of blocking in relation to a first setup request of an optical circuit from the first electrical switch to the second electrical switch; and (B) performing, if the blocking is present, at least one process of a first process in which a second setup request of the optical circuit from the first electrical switch to the second electrical switch is transmitted from the first electrical switch and a second process in which a packet or a packet flow related to the first setup request is transmitted from the first electrical switch via the electrical network.

According to the present invention, there is provided a communication control apparatus for controlling communication between a first electrical switch and a second electrical switch each connected via an optical network and an electrical network and each responsible for one or more devices. The communication control apparatus determines the presence or absence of blocking in relation to a first setup request of an optical circuit from the first electrical switch to the second electrical switch and performs, if the blocking is present, at least one of a first process of transmitting a request for retransmitting the first setup request to the first electrical switch and a second process for starting communication via the electrical network from the first electrical switch to the second electrical switch.

BRIEF DESCRIPTION OF DRAWINGS

FIG. 6 is a diagram showing an example of a table for managing input/output ports of an optical circuit switch.

DESCRIPTION OF EMBODIMENTS

Embodiment 1

Figure 1:
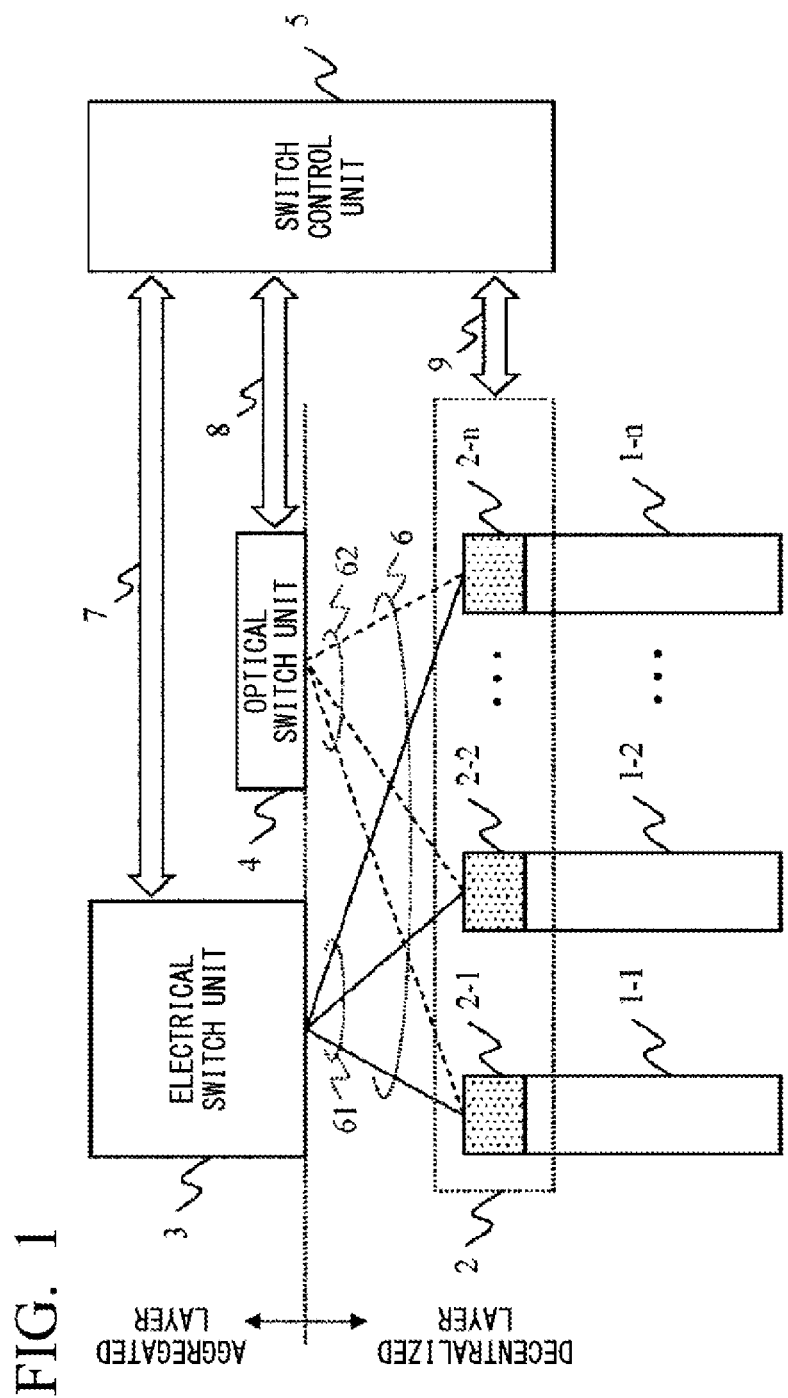
FIG. 1 is a diagram showing a configuration of a hybrid electrical/optical switch network according to an embodiment of the present invention.

FIG. 1 shows an example of a configuration of a hybrid electrical/optical switch network according to an embodiment of the present invention. The hybrid electrical/optical switch network shown in FIG. 1 includes a rack unit 1, a ToR switch unit 2, an electrical switch unit 3, an optical switch unit 4, a switch control unit 5, a cable wiring unit 6, a control circuit 7 for the electrical switch unit 3, a control circuit 8 for the optical switch unit 4, and a control circuit 9 for the ToR switch unit 2. This hybrid electrical/optical switch network is a multi-layer switch network having a ToR switch unit 2 at a lower level and an electrical switch unit 3 and an optical switch unit 4 at a higher level. Hereinafter, the lower-level layer is referred to as a decentralized layer, and the higher-level layer is referred to as an aggregated layer. The optical switch unit 4 is an example of an optical network and the electrical switch unit 3 is an example of an electrical network. Also, the switch control unit 5 is an example of a communication control apparatus.

The rack unit 1 includes racks 1-1 to 1-$n$ and the ToR switch unit 2 includes ToR switches 2-1 to 2-$n$. Each ToR switch of the ToR switch unit 2 and the electrical switch unit 3 are connected by an electrical or optical cable wiring unit 61. Each ToR switch of the ToR switch unit 2 and the optical switch unit 4 are connected by an optical cable wiring unit 62. For example, in the datacenter of Non-Patent Literature 1, the ToR switch unit 2 may include about 1,000 or more ToR switches. In this case, about tens of thousands to hundreds of thousands of servers are accommodated. The server is an example of an information processing device and is a device which includes the server and the storage device and for which the ToR switch is responsible.

Figure 2:
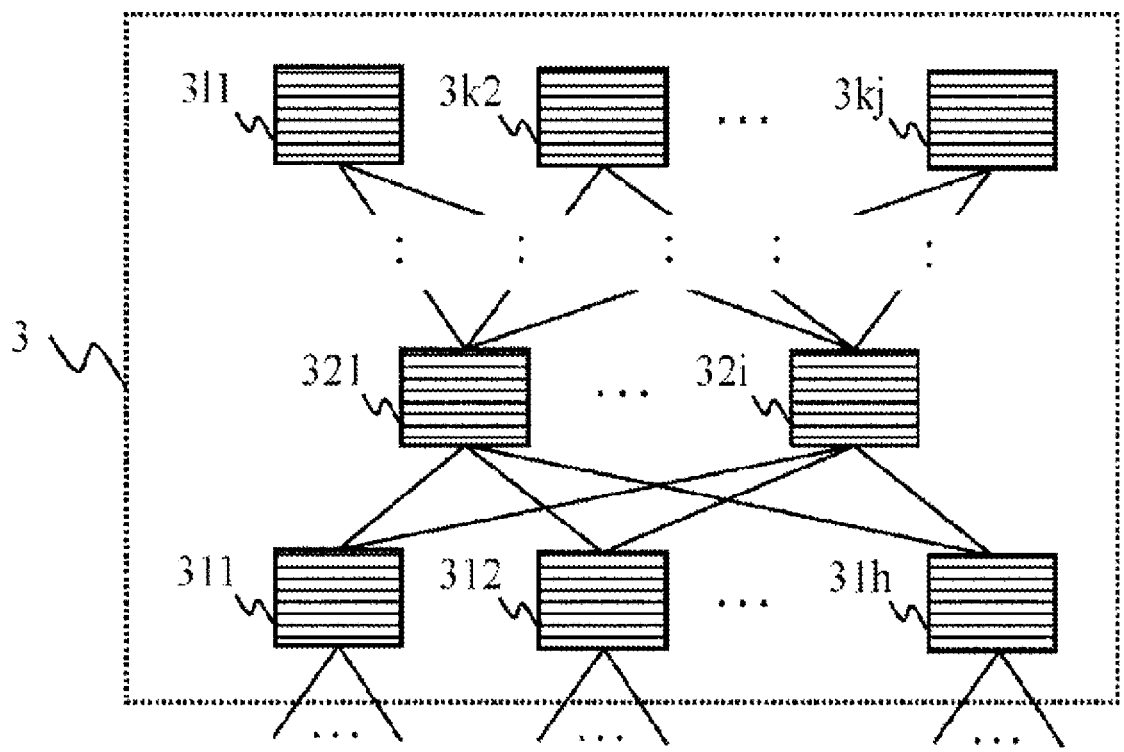
FIG. 2 is a diagram showing an example of a configuration of an electrical switch unit.

In FIG. 2, an example of a configuration of the electrical switch unit 3 shown in FIG. 1 is shown. The electrical switch unit 3 includes a single- or multi-layer electrical router or an electrical packet switch. These are examples of an electrical communication device. For example, h electrical communication devices 311 to 31$h$ connected to the ToR switch unit 2 of the decentralized layer are connected to j electrical communication devices 3$k$1 to 3$kj$ located in a highest-level stage k of the electrical switch unit 3 through i electrical communication devices 321 to 32$i$. The number of stages k of the electrical switch unit 3 and the number of parallel electrical communication devices h located at the lowest level of the electrical switch unit 3 is a numerical value greater than or equal to 1. Also, the number of parallel electrical communication devices i or j located at a higher level is a numerical value greater than or equal to 0.

Figure 3:
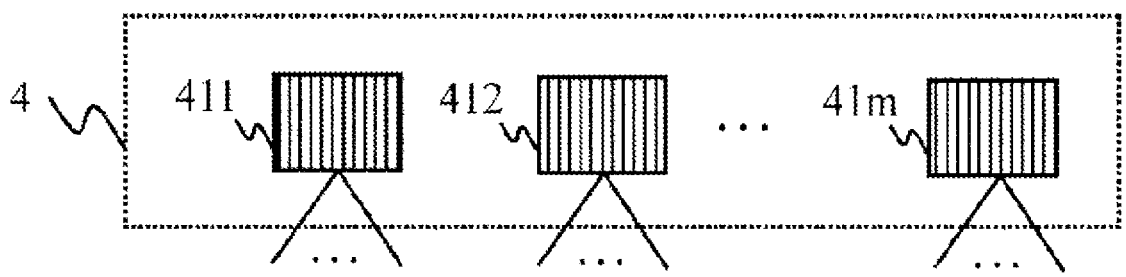
FIG. 3 is a diagram showing an example of a configuration of an optical switch unit.

In FIG. 3, an example of a configuration of the optical switch unit 4 shown in FIG. 1 is shown. The optical switch unit 4 includes one or more optical circuit switches. The optical circuit switch is an example of an optical communication device. Also, an optical communication device and an electrical communication device are collectively referred to as communication devices. For example, the optical circuit switches 411 to 41$m$ are connected to ToR switches in the ToR switch unit 2 of the decentralized layer. Also, the number of parallel optical circuit switches m is a numerical value greater than or equal to 1. An optical circuit switch having a scale of several thousand ports is used to cope with the datacenter of Non-Patent Literature 1. For example, an example of a method of configuring a large-scale optical switch is disclosed in Non-Patent Literature 2.

Figure 4:
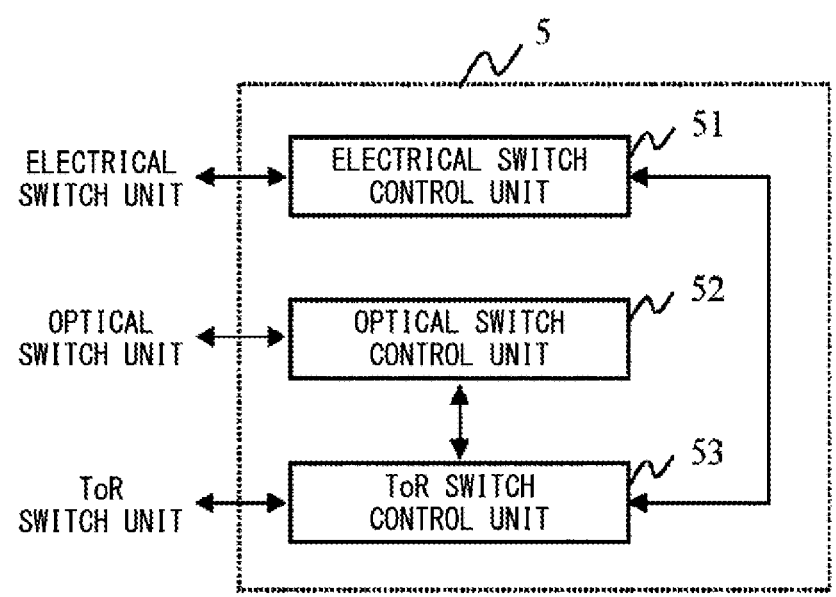
FIG. 4 is a diagram showing an example of a functional configuration of a switch control unit.

In FIG. 4, an example of a configuration of the switch control unit 5 shown in FIG. 1 is shown. The switch control unit 5 includes an electrical switch control unit 51, an optical switch control unit 52, and a ToR switch control unit 53. The electrical switch control unit 51 is connected to the electrical switch unit 3 via the control circuit 7 for the electrical switch unit 3. The optical switch control unit 52 is connected to the optical switch unit 4 via the control circuit 8 for the optical switch unit 4. The ToR switch control unit 53 is connected to the ToR switch unit 2 via the control circuit 9 for the ToR switch unit 2. Also, control signals output by the electrical switch control unit 51 and the ToR switch control unit 53 and control signals output by the optical switch control unit 52 and the ToR switch control unit 53 may be mutually shared in the switch control unit 5.

Figure 5:
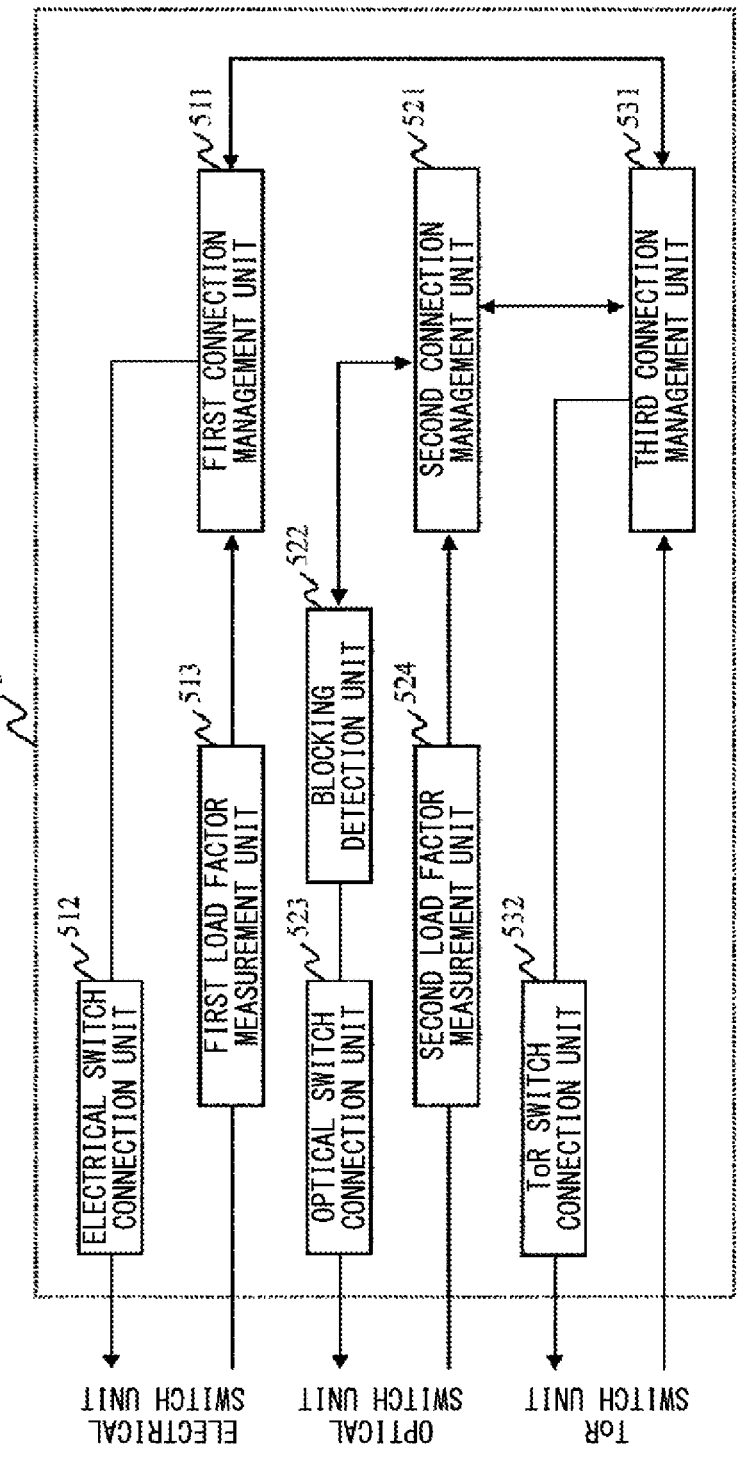
FIG. 5 is a diagram showing a detailed example of a functional configuration of a switch control unit.

In FIG. 5, an example of a detailed configuration of the electrical switch control unit 51, the optical switch control unit 52, and the ToR switch control unit 53 shown in FIG. 4 is shown. The electrical switch control unit 51 includes a first connection management unit 511, an electrical switch connection unit 512, and a first load factor measurement unit 513. The optical switch control unit 52 includes a second connection management unit 521, a blocking detection unit 522, an optical switch connection unit 523, and a second load factor measurement unit 524. The ToR switch control unit 53 includes a third connection management unit 531 and a ToR switch connection unit 532.

The first connection management unit 511 collects connection information (information about a connection state) of the electrical switch unit 3 via the control circuit 7 for the electrical switch unit 3 and the first load factor measurement unit 513 and outputs a control signal related to a switching operation of the electrical switch unit 3 to the electrical switch connection unit 512. The electrical switch connection unit 512 performs a setup process for the electrical communication device within the electrical switch unit 3 according to the control signal.

The second connection management unit 521 collects connection information (information about a connection state) of the optical switch unit 4 via the control circuit 8 for the optical switch unit 4 and the second load factor measurement unit 524 and outputs a control signal related to a switching operation of the optical switch unit 4 to the blocking detection unit 522. The second connection management unit 521 and the blocking detection unit 522 share the control signal related to the switching operation of the optical switch unit 4. The blocking detection unit 522 outputs the control signal related to the switching operation of the optical switch unit 4 from the second connection management unit 521 to the optical switch connection unit 523. The optical switch connection unit 523 performs a setup process for the optical circuit switch in the optical switch unit 4 in accordance with the control signal.

The third connection management unit 531 collects connection information (information about a connection state) of the ToR switch unit 2 via the control circuit 9 for the ToR switch unit 2 and outputs a control signal related to a switching operation of the ToR switch unit 2 to the ToR switch connection unit 532. The ToR switch connection unit 532 performs a setup process for the ToR switch in the ToR switch unit 2 in accordance with the control signal.

Also, the first connection management unit 511 and the third connection management unit 531 may share their control signals and the second connection management unit 521 and the third connection management unit 531 may share their control signals. Also, the first load factor measurement unit 513 measures a load factor from the number of electrical packets or packet flows incoming into the electrical switch unit 2 and outgoing from the electrical switch unit 3. The second load factor measurement unit 524 measures the load factor from the number of packets or packet flows incoming into the optical switch unit 4 and outgoing from the optical switch unit 4. Here, the load factor is calculated from the number of packets or packet flows flowing through each cable of the electrical or optical cable wiring unit 61, the number of packets or packet flows related to a plurality of cables, or the like. For example, if there is a packet or a packet flow corresponding to 1 Gbps in one 10 Gbps cable, the load factor becomes 0.1. Also, if there are packets or packet flows corresponding to 1 Gbps, 2 Gbps, and 3 Gbps for the three 10 Gbps cables, the load factor becomes 0.2 (=(1+2+3)/30). The scale of the load factor is not limited to this and various types of methods are assumed.

Next, an operation of the hybrid electrical/optical switch network according to the present embodiment will be described. As an example, a case where servers included in two different racks or the two different racks deliver information via the optical switch unit 4 is assumed. Here, the ToR switch on the transmitting side is referred to as ToR switch #A and the ToR switch on the receiving side is referred to as ToR switch #B.

ToR switch #A transmits an optical circuit setup request destined for ToR switch #B to the third connection management unit 531 for the ToR switch unit 2. In response to this, the third connection management unit 531 delivers information about a connection request between ToR switch #A and ToR switch #B to the second connection management unit 521 for the optical switch unit 4. In response to this, the second connection management unit 521 outputs an instruction for setting up an optical circuit between ToR switch #A and ToR switch #B to the blocking detection unit 522. At this time, the blocking detection unit 522 confirms whether or not an optical circuit can be set up between ToR switch #A and ToR switch #B according to the request, i.e., whether or not blocking has occurred.

Figure 6:
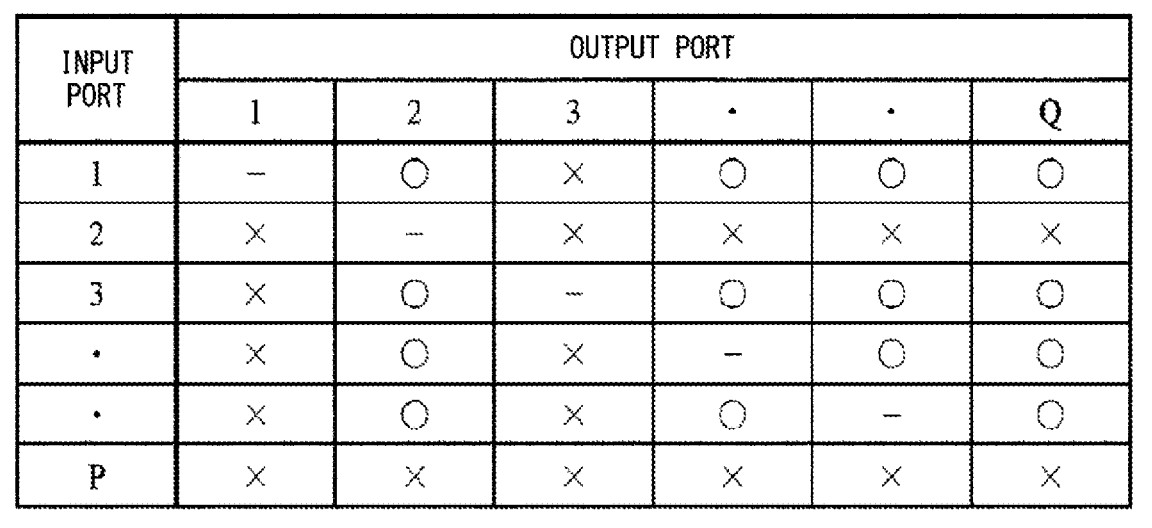

As a blocking detection method, a method of determining that blocking has occurred if the input/output port of the optical circuit switch satisfying the optical circuit setup request from the ToR switch unit 2 is already being used and the like can be considered. For example, the second connection management unit 521 manages the connection state in a table as shown in FIG. 6. In FIG. 6, the connection state of the optical circuit switch having the number of input ports P and the number of output ports Q is shown. Also, the connection state indicates that a connection is possible or impossible for each combination of input/output ports.

In the example of FIG. 6, each row corresponds to an input port, each column corresponds to an output port, a set of connectable input/output ports is indicated by a circle (o) and a set of input/output ports that are unconnectable because they are already connected or excluded is indicated by a cross mark (x). Here, a set of input/output ports having the same number is excluded (as indicated by the minus mark (−)). In this example, a connection between the input port 2 and the output port 1 and a connection between the input port P and the output port 3 are already established and a set associated with these input/output ports is indicated by the cross mark (x) indicating the connection completion or the minus mark (−). In this way, in the present embodiment, the connection state of the optical switch unit 4 can be confirmed only by managing and referring to the table as shown in FIG. 6 without managing the connection state of the entire network. In the prior art shown in Patent Literature 1 and Non-Patent Literature 2 described above, the availability of all electrical and optical switches connected to the hybrid electrical/optical switch network is confirmed and the presence or absence of blocking and the availability of circuit setup are determined. Therefore, in the present embodiment, low-latency and simple control is enabled as compared with the prior art.

When the optical circuit can be set up, the optical switch connection unit 523, which has received an instruction from the second connection management unit 521, sets up the optical circuit between ToR switch #A and ToR switch #B via the optical switch unit 4. If the optical circuit cannot be set up, the blocking detection unit 522 determines that blocking has occurred and notifies the third connection management unit 531 for the ToR switch unit 2 via the second connection management unit 521 of blocking information.

As a first example, the third connection management unit 531, which has received the notification of the blocking information, outputs information about the connection request between ToR switch #A and ToR switch #B to the first connection management unit 511 in order to transfer immediately a packet and a packet flow, which are initially supposed to be delivered by the optical circuit in ToR switch #A, to the electrical switch unit 3. In response to this, the first connection management unit 511 causes the electrical switch unit 3 to be set up via the electrical switch connection unit 512.

Also, as a second example, a transfer operation of the optical circuit is first tried again, but the packet or the packet flow is transferred from ToR switch #A to ToR switch #B via the electrical switch unit 3 if a certain condition is satisfied. Thus, the third connection management unit 531, which has received a notification of blocking information, transmits a retransmission request to ToR switch #A, which is the transmission source of the optical circuit setup request. In response to this, ToR switch #A retransmits the optical circuit setup request to the switch control unit 5.

The certain condition mentioned above is, for example, a condition that the number of retransmissions of the optical circuit setup request based on blocking reaches the certain number of times. If this condition is satisfied, the third connection management unit 531 outputs information about a connection request between ToR switch #A and ToR switch #B to the first connection management unit 511 in order to transfer a packet or a packet flow, which is supposed to be transferred by the optical circuit in ToR switch #A, to the electrical switch unit 3. In response to this, the first connection management unit 511 causes the electrical switch unit 3 to be set up via the electrical switch connection unit 512.

The certain condition mentioned above may be a condition that the duration of the optical circuit setup request transmission from initial blocking occurrence detection for the optical circuit setup request has reached a preset certain period of time.

Further, as a third example, there is a method using information of the blocking detection unit 522 and the first load factor measurement unit 513 for the electrical switch unit 3 and the like. For example, the third connection management unit 531 for the ToR switch unit 2, which has received a notification of the blocking information, acquires information of the usage rate or the load factor of the electrical switch unit 3 or the usage rate of a cable (also referred to as a link) connecting ToR switch #A and the electrical switch unit 3 via the first connection management unit 511 for the electrical switch unit 3. Also, the first connection management unit 511 manages registration information of the electrical communication device included in the electrical switch unit 3 and the occupancy degree and the availability of the input/output port. This registration information is information for identifying an entity of an electrical communication device and is, for example, a MAC address, an IP address, or the like. Because each electrical communication device in the electrical switch unit 3 periodically provides a notification of the occupancy degree of the input/output port, the first connection management unit 511 manages the occupancy degree and the availability of the input/output port based on the occupancy degree. Here, various methods such as a method using a packet discard rate or a latency value in each electrical switch or router belonging to the electrical switch unit 3 as the usage rate of the electrical switch unit 3, a method based on a packet discard rate or a latency value in the entire electrical switch unit 3, and the like are applicable. Also, the usage rate of the cable connecting ToR switch #A and the electrical switch unit 3 is calculated from the number of packets or packet flows flowing through the cable of each electrical or optical cable wiring unit 61, the number of packets or packet flows related to a plurality of cables, or the like. For example, if there is a packet or a packet flow corresponding to 1 Gbps in one 10 Gbps cable, the load factor becomes 0.1. Also, if there are packets or packet flows corresponding to 1 Gbps, 2 Gbps, and 3 Gbps for the three 10 Gbps cables, the usage rate becomes 0.2 (=(1+2+3)/30). The scale of the usage rate is not limited to this and various types of methods are assumed.

The third connection management unit 531 determines whether or not the usage rate or the load factor of the electrical switch unit 3 or the usage rate of the cable connecting ToR switch #A and the electrical switch unit 3 is greater than or equal to a preset reference value. If the usage rate or the like is greater than or equal to the reference value, the third connection management unit 531 transmits a retransmission request to ToR switch #A, which is a transmission source of an optical circuit setup request such that an attempt is made to retransfer a packet or a packet flow, which is initially supposed to be transferred by the optical circuit in ToR switch #A, by the optical circuit. In response to this, ToR switch #A retransmits the optical circuit setup request to the switch control unit 5.

On the other hand, if the usage rate or the load factor of the electrical switch unit 3 or the usage rate of the cable connecting ToR switch #A and the electrical switch unit 3 is less than the preset reference value, a packet or a packet flow, which is initially supposed to be transferred by an optical circuit in ToR switch #A, is transferred via the electrical switch unit 3. Thus, the third connection management unit 531 outputs information about the connection request between ToR switch #A and ToR switch #B to the first connection management unit 511. In response to this, the first connection management unit 511 causes the electrical switch unit 3 to be set up via the electrical switch connection unit 512.

Figure 7:
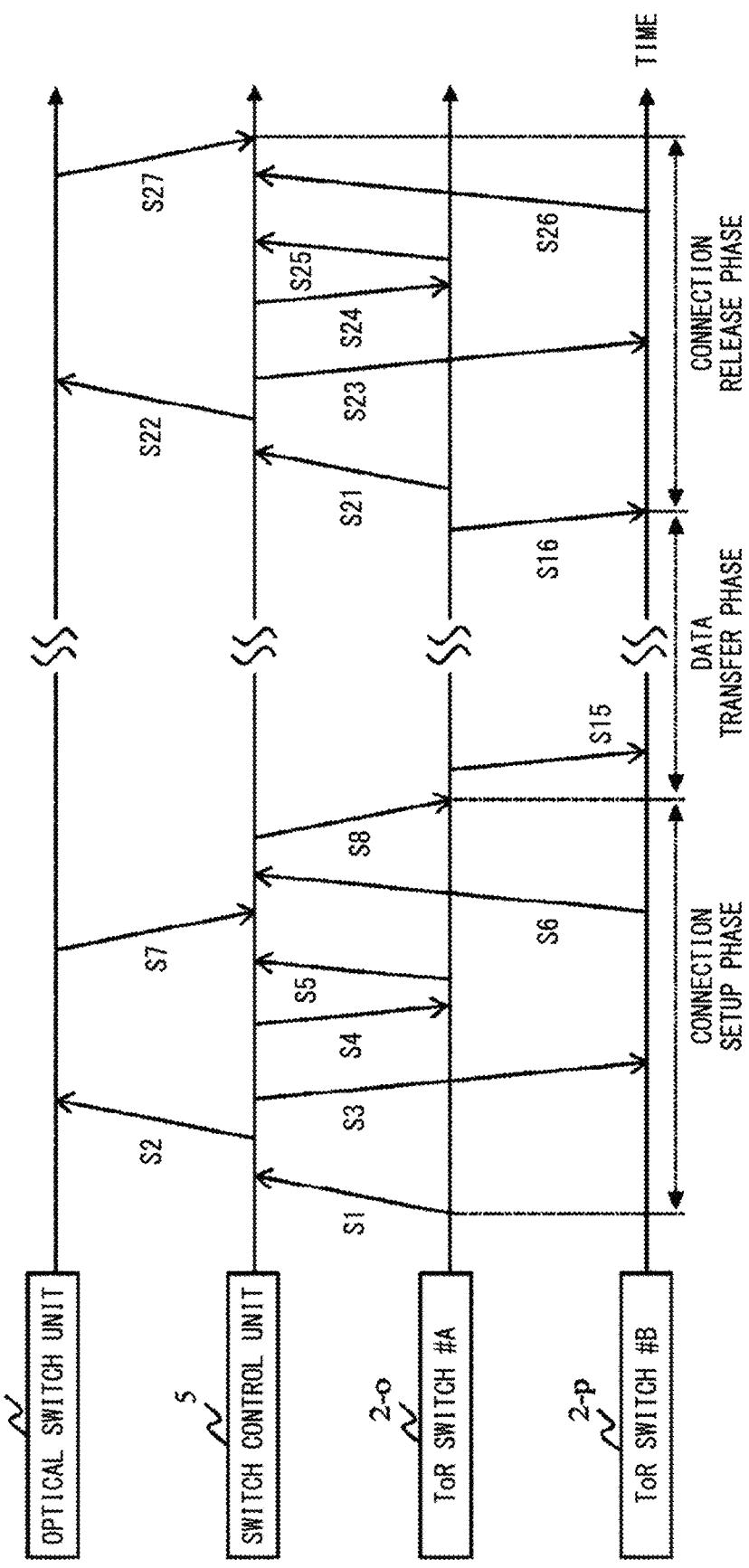
FIG. 7 is a diagram showing an example of a processing sequence of the hybrid electrical/optical switch network according to the embodiment of the present invention.

Next, a detailed processing sequence of the hybrid electrical/optical switch network according to the present embodiment will be described with reference to FIGS. 7 to 10. Hereinafter, a case where ToR switch #A (2-o) transfers a packet or a packet flow to ToR switch #B (2-p) through an optical circuit will be described. In the example of FIG. 7, a scenario in which blocking does not occur will be described. Also, in the present embodiment, each scenario includes three phases that are a connection setup phase, a data transfer phase, and a connection release phase.

In the connection setup phase, ToR switch #A (2-o) first transmits an optical circuit setup request to the switch control unit 5 (S1). The switch control unit 5, which has received the optical circuit setup request, transmits an optical circuit connection request to the optical switch unit 4 (S2). Thereby, the optical switch unit 4 sets up the optical circuit from ToR switch #A (2-o) to ToR switch #B (2-p). Also, the switch control unit 5 transmits a connection setup request by an optical circuit to ToR switch #B (2-p) (S3). Further, the switch control unit 5 transmits a transmission connection request to ToR switch #A (2-o) (S4). In response, ToR switch #A (2-o) transmits a transmission permission notification to the switch control unit 5 (S5). Also, ToR switch #B (2-p) transmits a reception permission notification to the switch control unit 5 if communication is possible (S6). On the other hand, after the setup of the optical circuit, the optical switch unit 4 transmits the optical circuit connection permission to the switch control unit 5 (S7). In this way, when positive responses are received from ToR switch #A (2-o), ToR switch #B (2-p), and the optical switch unit 4, the switch control unit 5 transmits a transmission instruction to ToR switch #A (2-o) (S8).

In the data transfer phase, ToR switch #A (2-o), which has received the transmission instruction, transmits a packet or a packet flow to ToR switch #B (2-p) (S15). When the transfer of the packet or the packet flow has been completed, ToR switch #A (2-o) notifies ToR switch #B (2-p) of the completion of data transmission (S16).

In the connection release phase, ToR switch #A (2-o) transmits an optical circuit release request to the switch control unit 5 (S21). In response, the switch control unit 5 transmits an optical circuit connection release request to the optical switch unit 4 (S22). The optical switch unit 4 performs a setup process for releasing a currently used optical circuit. Also, the switch control unit 5 transmits a connection release request to ToR switch #B (2-p) (S23). Further, the switch control unit 5 transmits a transmitter release request to ToR switch #A (2-o) (S24). In response, ToR switch #A (2-o) transmits a transmitter release notification to the switch control unit 5 (S25). Also, ToR switch #B (2-p) transmits a connection release notification to the switch control unit 5 (S26). Further, the optical switch unit 4 transmits an optical circuit release notification to the switch control unit 5 (S27).

Through such a series of processes, communication between the ToR switches is performed via the optical circuit in the optical switch unit 4. Also, the process may be speeded up by omitting some steps such as transmission permission and reception permission in relation to the process in the present sequence. Although the process for an abnormal event is not described in the series of processes, the corresponding process may be added as needed.

Figure 8:
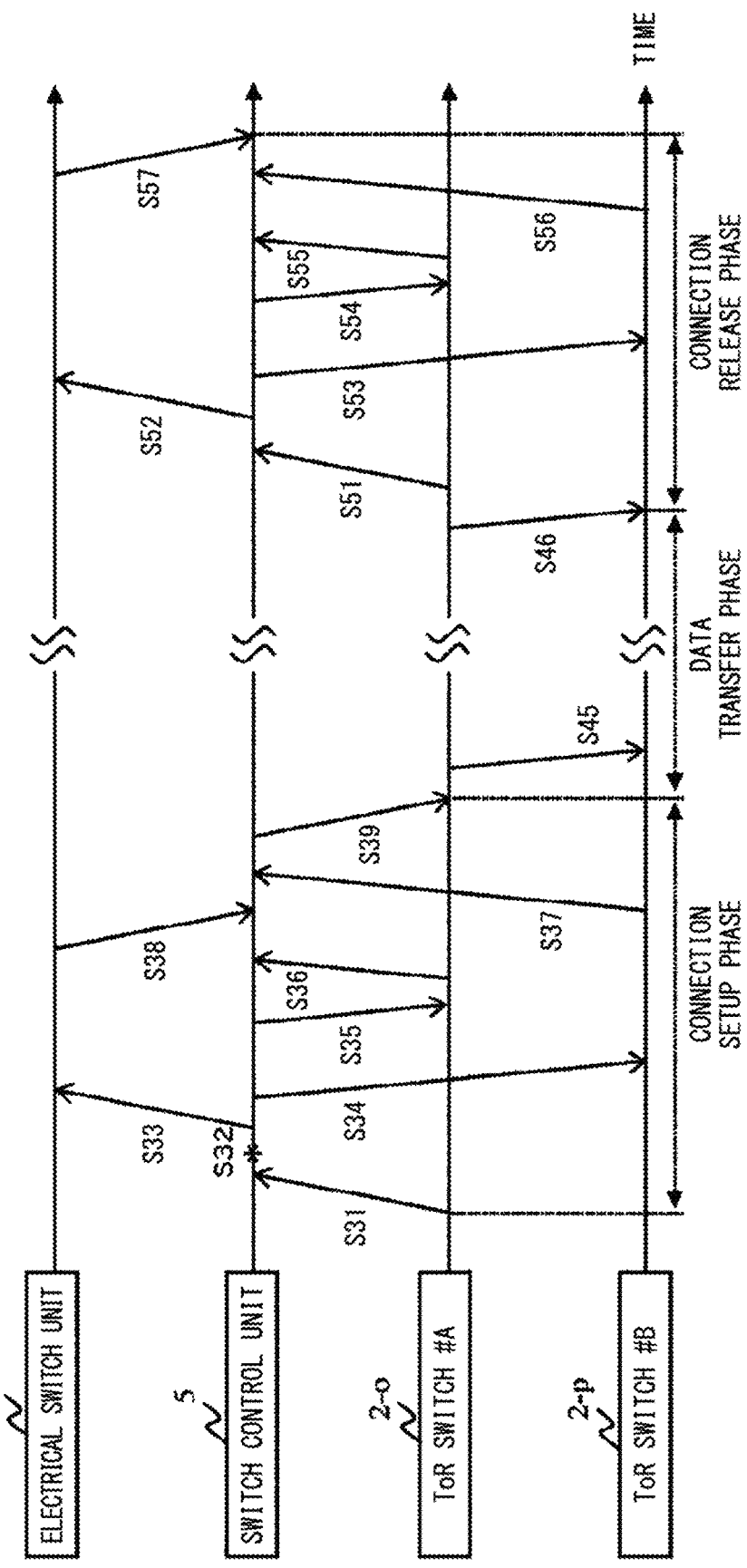
FIG. 8 is a diagram showing an example of a processing sequence of the hybrid electrical/optical switch network according to the embodiment of the present invention.

Next, an example of a processing sequence in which blocking is detected and ToR switch #A (2-o) transfers data via the electrical switch unit 3 will be described with reference to FIG. 8. In the connection setup phase, ToR switch #A (2-o) first transmits an optical circuit setup request to the switch control unit 5 (S31). Here, the blocking detection unit 522 of the switch control unit 5 detects the occurrence of blocking (S32). Thus, in the above-described first example, the switch control unit 5 immediately transmits an electrical circuit connection request to the electrical switch unit 3 (S33). On the other hand, in the above-described third example, the switch control unit 5 further determines whether or not the usage rate or the load factor of the electrical switch unit 3 or the usage rate of a cable connecting ToR switch #A (2-o) and the electrical switch unit 3 is greater than or equal to a preset reference value. If this condition is not satisfied, the switch control unit 5 transmits the electrical circuit connection request to the electrical switch unit 3 (S33). In this way, if a condition that a transfer via the electrical switch unit 3 is permitted is satisfied (the above-described usage rate or the like is less than the reference value), a transfer via the electrical circuit is performed even if a transfer via an optical circuit is initially assumed.

The switch control unit 5 transmits a connection setup request to ToR switch #B (2-p) via the electrical switch unit 3 (S34). Further, the switch control unit 5 transmits a transmission connection request to ToR switch #A (2-o) via the electrical switch unit 3 (S35). In response, ToR switch #A (2-o) transmits a transmission permission notification to the switch control unit 5 (S36). Also, ToR switch #B (2-p) transmits a reception permission notification to the switch control unit 5 if communication is possible (S37). On the other hand, after the setup of the electrical switch unit 3, the electrical switch unit 3 transmits the electrical circuit connection permission to the switch control unit 5 (S38). In this way, when positive responses are received from ToR switch #A (2-o), ToR switch #B (2-p), and the electrical switch unit 3, the switch control unit 5 transmits a transmission instruction to ToR switch #A (2-o) (S39).

In the data transfer phase, ToR switch #A (2-o), which has received the transmission instruction, transmits a packet or a packet flow to ToR switch #B (2-p) via the electrical switch unit 3 (S15). When the transfer of the packet or the packet flow has been completed, ToR switch #A (2-o) notifies ToR switch #B (2-p) of the completion of data transmission (S46).

In the connection release phase, ToR switch #A (2-o) transmits an electrical circuit release request to the switch control unit 5 (S51). In response, the switch control unit 5 transmits an electrical circuit connection release request to the electrical switch unit 3 (S52). The electrical switch unit 3 performs a setup process for releasing the currently used electrical circuit. Also, the switch control unit 5 transmits a connection release request to ToR switch #B (2-p) (S53). Further, the switch control unit 5 transmits a transmitter release request to ToR switch #A (2-o) (S54). In response, ToR switch #A (2-o) transmits a transmitter release notification to the switch control unit 5 (S55). Also, ToR switch #B (2-p) transmits a connection release notification to the switch control unit 5 (S56). Further, the electrical switch unit 3 transmits an electrical circuit release notification to the switch control unit 5 (S57).

Through such a series of processes, communication between the ToR switches is performed via the electrical circuit in the electrical switch unit 3. Also, the process may be speeded up by omitting some steps such as transmission permission and reception permission in relation to the process in the present sequence. Although the process for an abnormal event is not described in the series of processes, the corresponding process may be added as needed.

Figure 9:
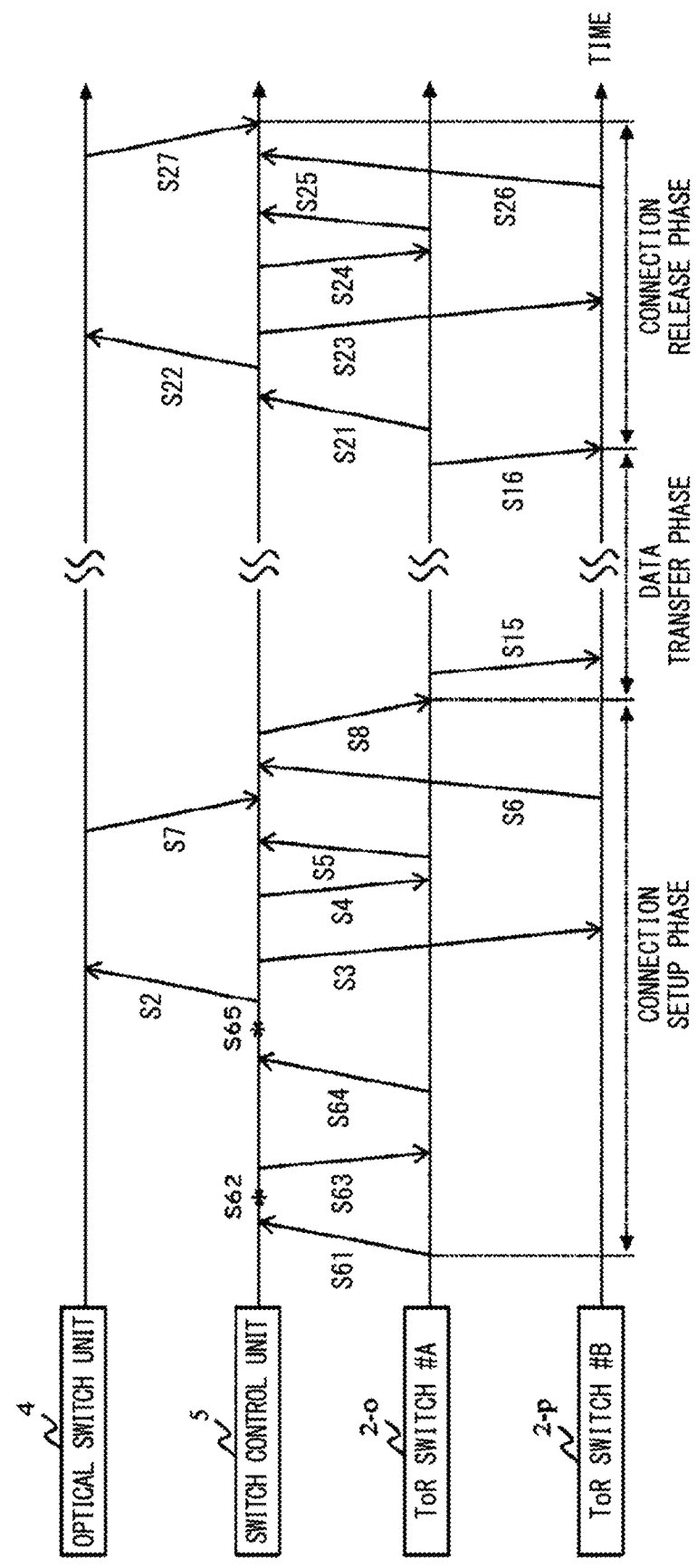
FIG. 9 is a diagram showing an example of a processing sequence of the hybrid electrical/optical switch network according to the embodiment of the present invention.

Next, an example of a processing sequence of a case where it is inappropriate for the ToR switch to transfer data via the electrical switch unit 3 in the above-described third example even if blocking is detected will be described with reference to FIG. 9. In the connection setup phase, ToR switch #A (2-o) first transmits an optical circuit setup request to the switch control unit 5 (S61). Here, the blocking detection unit 522 of the switch control unit 5 determines whether or not blocking has occurred (S62). Here, it is assumed that the occurrence of blocking is detected. Thus, in the above-described third example, the switch control unit 5 acquires the usage rate or the load factor of the electrical switch unit 3 or the usage rate of the cable connecting ToR switch #A (2-o) and the electrical switch unit 3 and further determines whether or not the usage rate or the load factor of the electrical switch unit 3 or the usage rate of the cable connecting ToR switch #A (2-o) and the electrical switch unit 3 is greater than or equal to a preset reference value. Here, it is assumed that this condition is satisfied. This is because there is a possibility that the load factor or the usage rate of the electrical switch unit 3 will further increase and the transfer efficiency will decrease if the transfer is performed via the electrical switch unit 3 even though this condition is satisfied.

Thus, the switch control unit 5 transmits the retransmission request to ToR switch #A (2-o) (S63). ToR switch #A (2-o) retransmits the optical circuit setup request to the switch control unit 5 in response to a retransmission request (S64). In response, the switch control unit 5 redetermines whether or not blocking has occurred (S65). If it is confirmed that no blocking has occurred here, the sequence from S2 shown in FIG. 9 will be executed in the subsequent processing sequence. Therefore, the description will be omitted. Also, if the occurrence of blocking is reconfirmed in step S65 and it is further determined that the usage rate or the load factor of the electrical switch unit 3 or the usage rate of the cable connecting ToR switch #A and the electrical switch unit 3 is greater than or equal to the preset reference value, the process returns to step S63 and the retransmission request is transmitted to ToR switch #A (2-o).

In this way, if blocking occurs on the assumption of a transfer via an optical circuit at the beginning, an appropriate transfer route is selected after considering a transfer via an electrical circuit.

Figure 10:
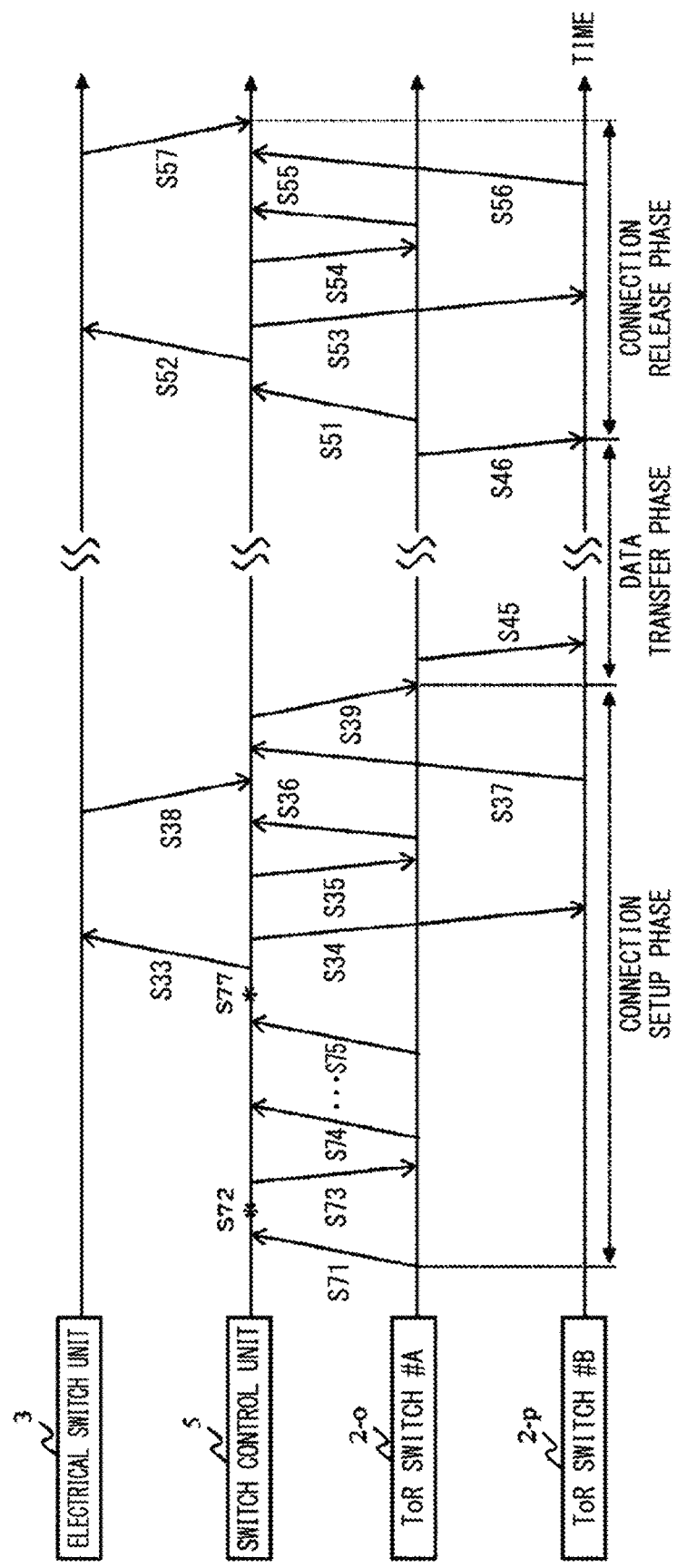
FIG. 10 is a diagram showing an example of a processing sequence of the hybrid electrical/optical switch network according to the embodiment of the present invention.

Next, an example of the processing sequence related to the above-described second example will be described with reference to FIG. 10. In the connection setup phase, ToR switch #A (2-o) first transmits an optical circuit setup request to the switch control unit 5 (S71). Here, the blocking detection unit 522 of the switch control unit 5 determines whether or not blocking has occurred (S72). Here, it is assumed that the occurrence of blocking is detected. Thus, in the above-described second example, the switch control unit 5 transmits a retransmission request to ToR switch #A (2-o) (S73). ToR switch #A (2-o) retransmits an optical circuit setup request to the switch control unit 5 in response to the retransmission request (S74). When the determination is made on the basis of the number of retransmissions, first retransmission is counted here. If it is based on the duration, the measurement of the duration is started from step S72. Step S72 is executed again and steps S73 and S74 are executed again if blocking still occurs.

Subsequently, ToR switch #A (2-o) transmits a retransmission request (S75) and, in response, the switch control unit 5 determines whether or not blocking has occurred. If the occurrence of blocking is still confirmed, the switch control unit 5 further determines whether or not the number of retransmissions is greater than or equal to a certain number or whether or not the duration is greater than or equal to a certain period of time (S77). If it is determined that this condition is satisfied, data is transferred via the electrical switch unit 3, such that the switch control unit 5 transmits an electrical circuit connection request to the electrical switch unit 3 (S33). A subsequent process is the same as the process from step S34 of FIG. 8 and therefore description thereof will be omitted.

By performing this process, an attempt is made to transfer data via the optical circuit basically. However, if blocking is not eliminated easily, the route can be switched such that data is transferred via the electrical switch unit 3.

Figure 11:
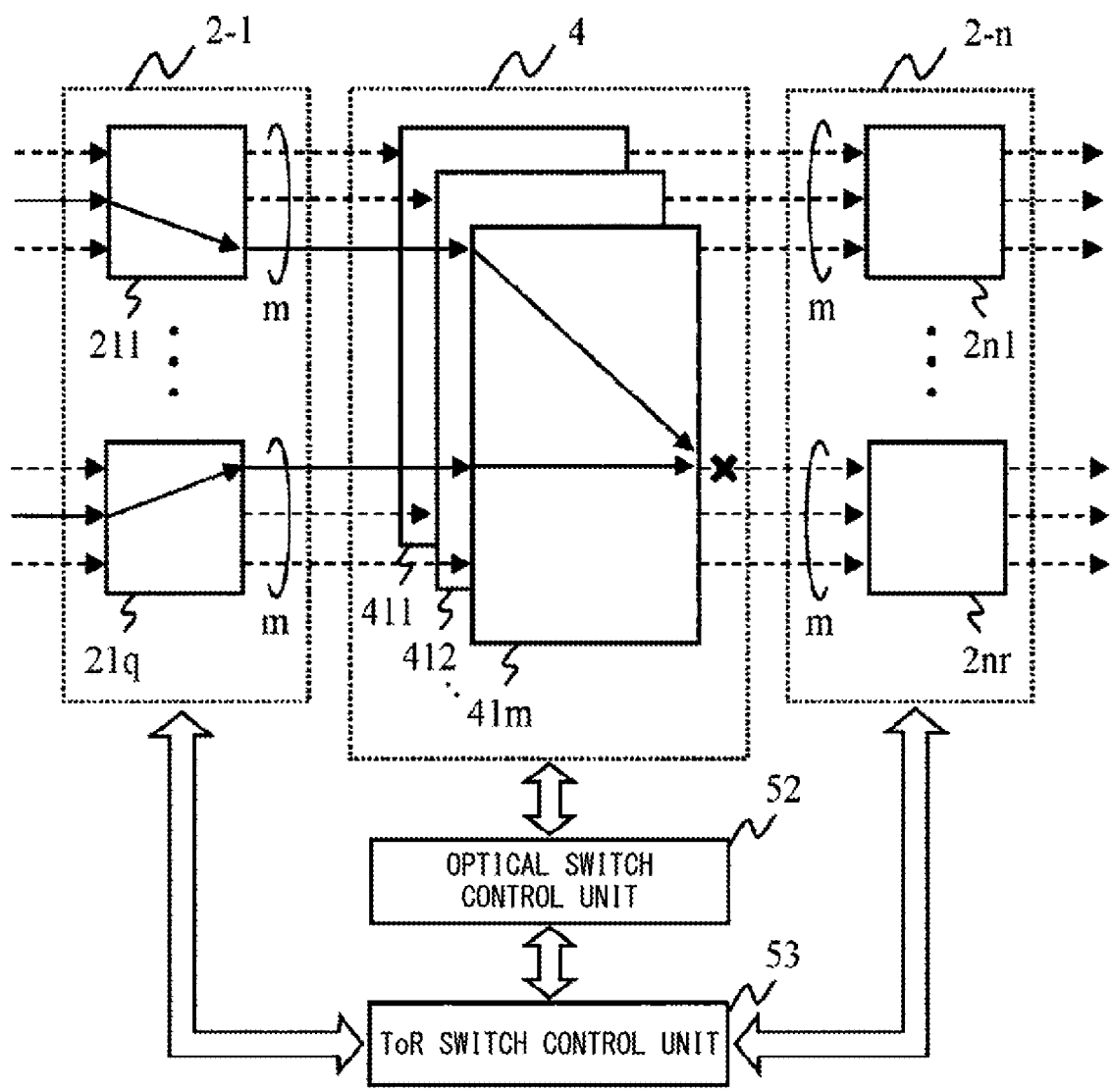
FIG. 11 is a diagram showing a network model used for calculating a blocking probability of the hybrid electrical/optical switch network according to the embodiment of the present invention.

Next, the blocking characteristics of the hybrid electrical/optical switch network according to the present embodiment will be described. FIG. 11 shows an example of a network model used for calculating a blocking probability. In the example shown in FIG. 11, a case where the transmitting-side ToR switch unit 2-1 and the receiving-side ToR switch unit 2-n (each ToR switch includes a transmission unit and a reception unit) communicate with each other via the optical switch unit 4 is considered. The transmitting-side ToR switch unit 2-1 includes q electrical switches 211 to 21$q$. The optical switch unit 4 includes m optical circuit switches 411 to 41$m$. The receiving-side ToR switch unit 2-$n$ includes r electrical switches 2$n$1 to 2$nr$.

Here, for convenience of description, a case where the number of electrical switches arranged in the ToR switch unit is the same between the transmitting side and the receiving side, i.e., q=r, is considered. At this time, interconnections between the electrical switches and the optical switch unit 4 are established via m input/output ports. The ToR switch control unit 53 and the optical switch control unit 52 manage the connection state between the ToR switch unit 2 and the optical switch unit 4.

Figure 12:
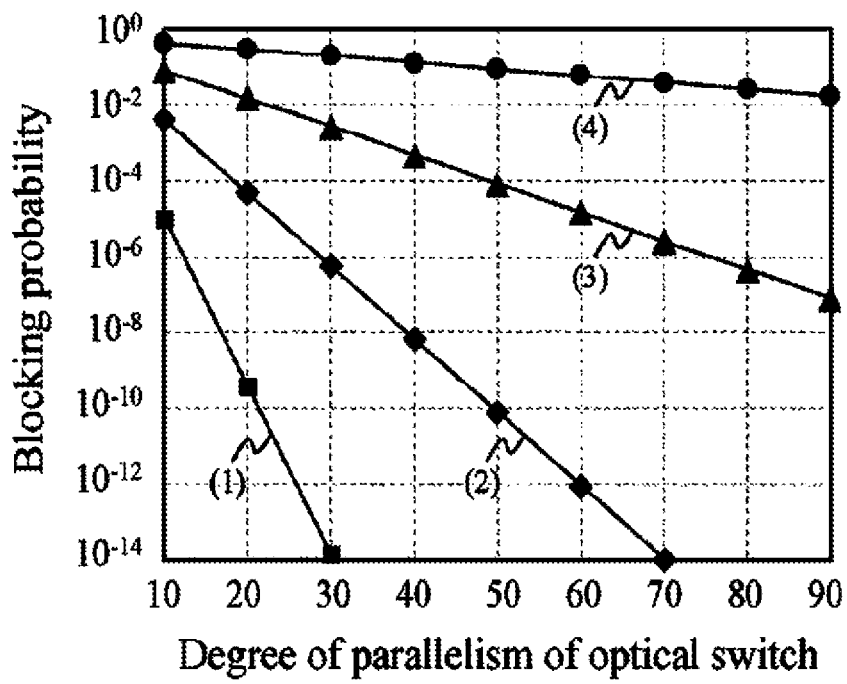
FIG. 12 is a diagram showing blocking characteristics of an optical circuit switch calculated on the basis of the network model.

FIG. 12 is a diagram showing blocking characteristics of an optical circuit switch calculated on the basis of the model diagram of FIG. 11. The vertical axis represents a blocking probability. The horizontal axis represents the number of parallel optical circuit switches (m in this case) and a connection is established using a plurality of ports (m) of the electrical switch arranged in each ToR. Assuming that q=r=1000 for simplification, for example, when the number of parallel optical circuit switches m is 64, the number of input/output ports of each optical circuit switch of the optical switch unit 4 is 1000 per direction and the total number of input/output ports of the optical switch unit 4 is 64000 (=1000*64) per direction. Also, lines (1) to (4) indicate differences in the load factor ρ. The lines (1), (2), (3), and (4) correspond to load factors ρ=0.2, ρ=0.4, ρ=0.6, and ρ=0.8, respectively.

When the number of parallel optical circuit switches m is greater than or equal to 64, the blocking probability can be limited to $10^{-5}$ or less by setting the load factor to 0.6 or less. The blocking probability when the optical circuit setup request is retransmitted after blocking occurs is considered. For example, when blocking has occurred with the quality of a blocking probability of $10^{-6}$, an attempt is made to retransfer a packet or a packet flow, which is initially supposed to be transferred by the optical circuit, by the optical circuit. At this time, if each transmission event is independent, a blocking probability for two consecutive blocking events is $10^{-6} \times 10^{-6} = 10^{-12}$. Because the blocking probability of $10^{-12}$ is a small value and a probability that the optical circuit setup request retransmitted in this way will be blocked again is significantly low, the retransmission process as described in the present embodiment is significantly effective.

On the other hand, assuming that processing latency due to one optical circuit setup process is a definite value of 100 μs, the latency time is a definite value of 200 μs even if retransmission is performed. This value is small compared to the latency time of the current datacenter. As another example, a case where a packet or a packet flow, which is initially supposed to be transmitted by an optical circuit, is transferred to the electrical switch unit 3 when blocking has occurred is considered. Assuming that proportions of traffic handled by the optical switch unit 4 and the electrical switch unit 3 in each ToR switch are 0.9 and 0.1, respectively, a traffic volume of $0.9 \times 10^{-6} \approx 10^{-6}$ is transferred to the electrical switch unit 3 when blocking has occurred with the quality of a blocking probability of $10^{-6}$. Because the traffic from the ToR switch handled by the electrical switch unit 3 is 0.1, the increase in the usage rate of the link to the electrical switch unit 3 of the ToR switch is $10^{-6}/0.1 = 10^{-5}$ (0.001%) when the traffic volume of $10^{-6}$ has been received.

The increase of a usage rate of 0.001% is a value that has substantially no influence on the latency time of the electrical switch unit 3.

On the other hand, the blocking probability for increasing the usage rate of the link for the electrical switch unit of the ToR switch by 1% is $10^{-3}$, and by lowering the blocking probability of the optical switch unit 4 to a value thereof or less ($10^{-4}$ or less or the like), the influence of blocking on the electrical switch unit 3 can be reduced. Thereby, control mechanisms of the electrical switch unit 3 and the optical switch unit 4 can be handled independently and route selection control can be implemented with a simple software or hardware configuration, such that it is possible to improve the performance of the intra-datacenter network using an efficient hybrid electrical/optical switch.

As described above, in the present embodiment, it is possible to reduce the possibility that the data transfer will fail by selecting a route along which data passes through the electrical switch unit 3 or the optical switch unit 4 after the occurrence of blocking and transferring a packet or a packet flow of the transmitting-side ToR switch along the selected route. Also, an appropriate value of m is set, such that the blocking probability of the optical switch unit 4 or a value of the increased usage rate of the electrical switch unit when the optical circuit setup request is retransmitted can be significantly decreased and an expected value of the latency time distribution for the successful transfer can be decreased. Furthermore, because dynamic network control including the entire network is not performed, the network can be controlled with a simple software or hardware configuration. Thereby, the processing latency caused in the switch control unit 5 is reduced and a high-speed data transfer is possible.

Embodiment 2

Figure 13:
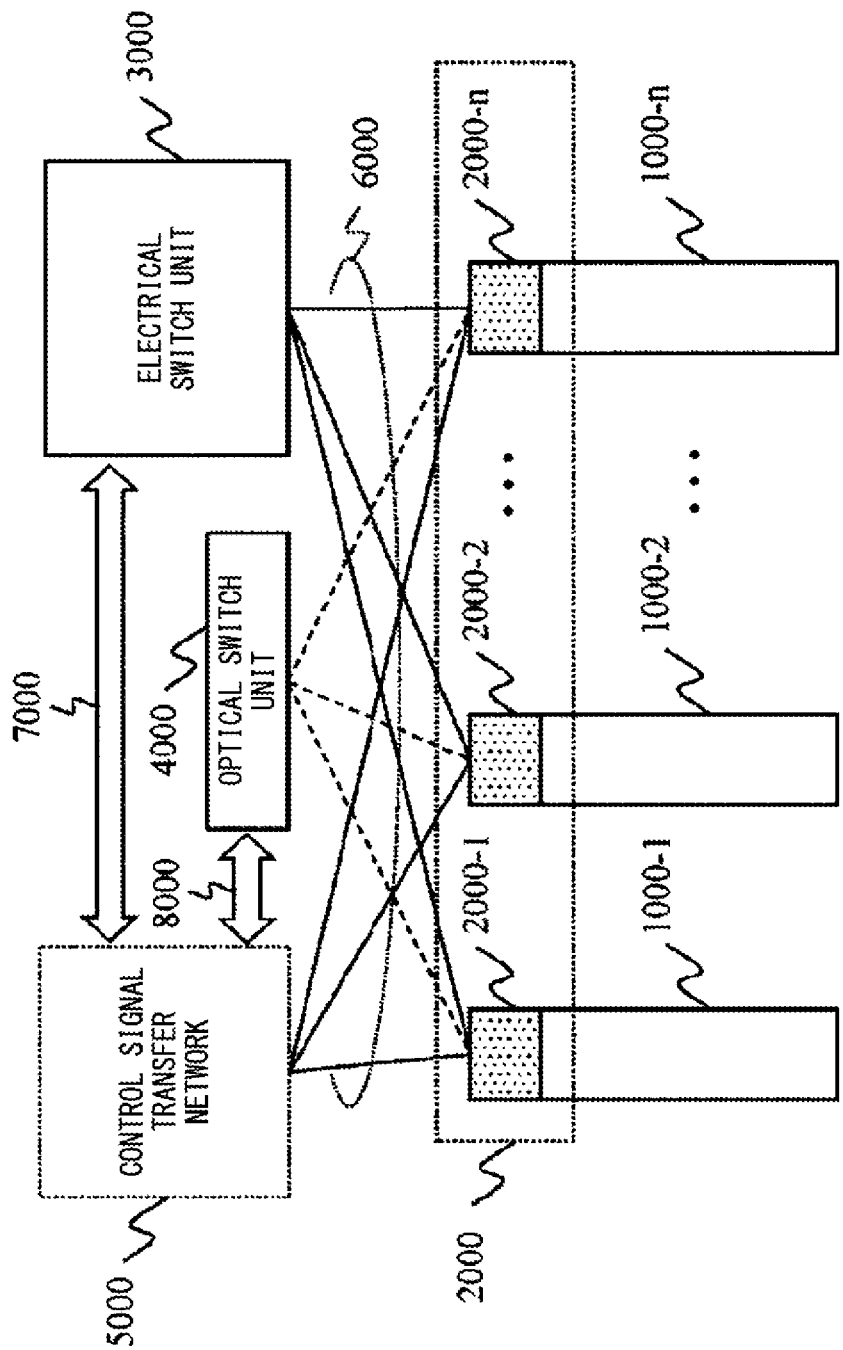
FIG. 13 is a diagram showing a configuration of a hybrid electrical/optical switch network according to a second embodiment of the present invention.

FIG. 13 shows a configuration of the hybrid electrical/optical switch network according to the second embodiment of the present invention. The hybrid electrical/optical switch network shown in FIG. 13 includes a rack unit 1000, a ToR switch unit 2000, an electrical switch unit 3000, an optical switch unit 4000, a control signal transfer network 5000, a cable wiring unit 6000, a control circuit 7000 for the electrical switch unit 3000, and a control circuit 8000 for the optical switch unit 4000. The rack unit 1000 includes racks 1000-1 to 1000-*n* and the ToR switch unit 2000 includes ToR switches 2000-1 to 2000-*n*. Each ToR switch of the ToR switch unit 2000 and the electrical switch unit 3000 are connected by an electrical or optical cable. Each ToR switch of the ToR switch unit 2000 and the optical switch unit 4000 are connected by an optical cable.

The control signal transfer network 5000 shares a control signal with the optical switch unit 4000 and the electrical switch unit 3000 as needed via the control circuit 8000 for the optical switch unit 4000 and the control circuit 7000 for the electrical switch unit 3000 as needed. Also, the control signal transfer network 5000 delivers a control signal, a network connecting the ToR switch unit 2000 and the optical switch unit 4000 and the electrical switch unit 3000 as needed has a role of delivering information and is a network functionally independent of the optical switch unit 4000 or the electrical switch unit 3000 for transferring a signal between the ToR switches.

Next, an operation of the hybrid electrical/optical switch network shown in FIG. 13 will be described. For example, a case where two different racks deliver information via the optical switch unit 4000 is considered. Here, the ToR switch on the transmitting side is referred to as ToR switch #C and the ToR switch on the receiving side is referred to as ToR switch #D. ToR switch #C notifies the switch control unit of an optical circuit setup request destined for ToR switch #D via the control signal transfer network 5000. In response to this optical circuit setup request, the ToR switch control unit 53 delivers information about a connection request between ToR switch #C and ToR switch #D to the second connection management unit 521 for the optical switch unit. If the optical circuit cannot be set up, it is determined that blocking has occurred. In this case, as in the first embodiment, an attempt is made to retransmit the optical circuit setup request from ToR switch #C to ToR switch #D.

In this way, it is possible to transfer stable and high-quality control signals regardless of a magnitude of the load of the intra-datacenter network by separately constructing the control signal transfer network 5000 independent of the optical switch unit 4000 and the electrical switch unit 3000. Also, when blocking has been detected, a packet or packet flow, which is initially supposed to be delivered by the optical circuit at in ToR switch #C, can also be used for a transfer to ToR switch #D via the control signal transfer network 5000. The control signal transfer network 5000 includes electrical routers or electrical packet switches of one or more layers and has a configuration similar to that of the electrical switch unit 3. Thus, the hybrid electrical/optical switch network according to the present embodiment can also transfer data with high reliability and low latency.

Other Embodiments

Figure 14:
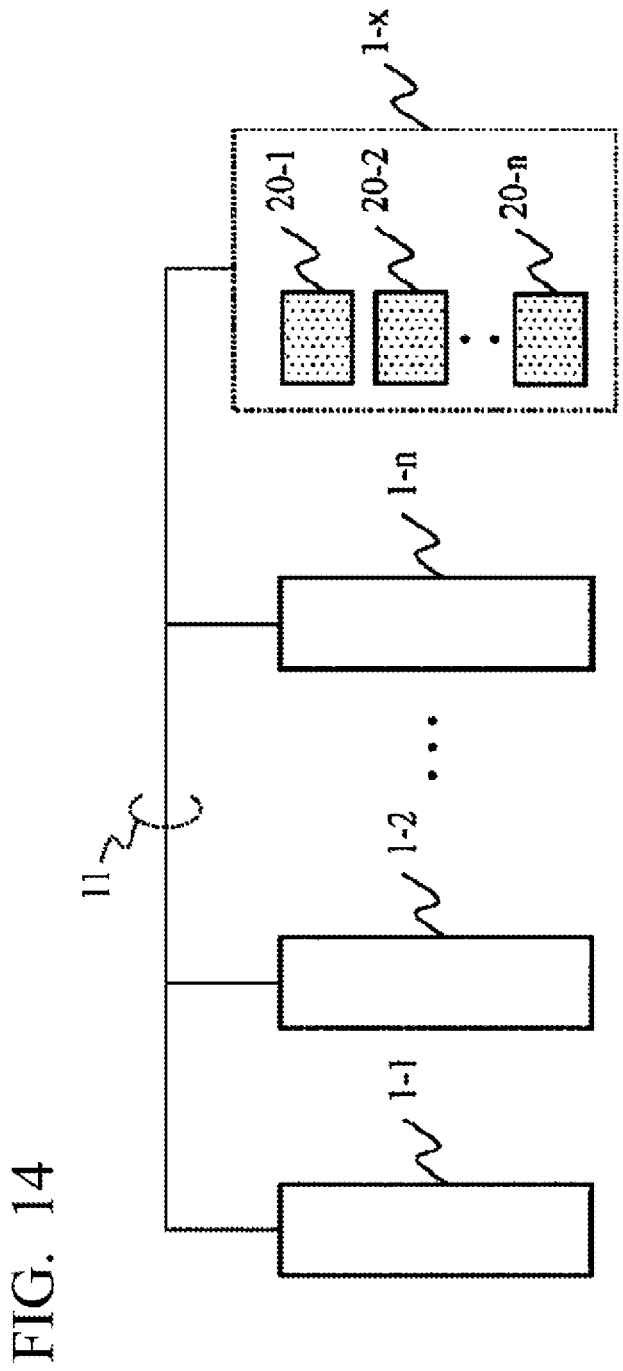
FIG. 14 is a diagram showing another example of a rack configuration.
Figure 15:
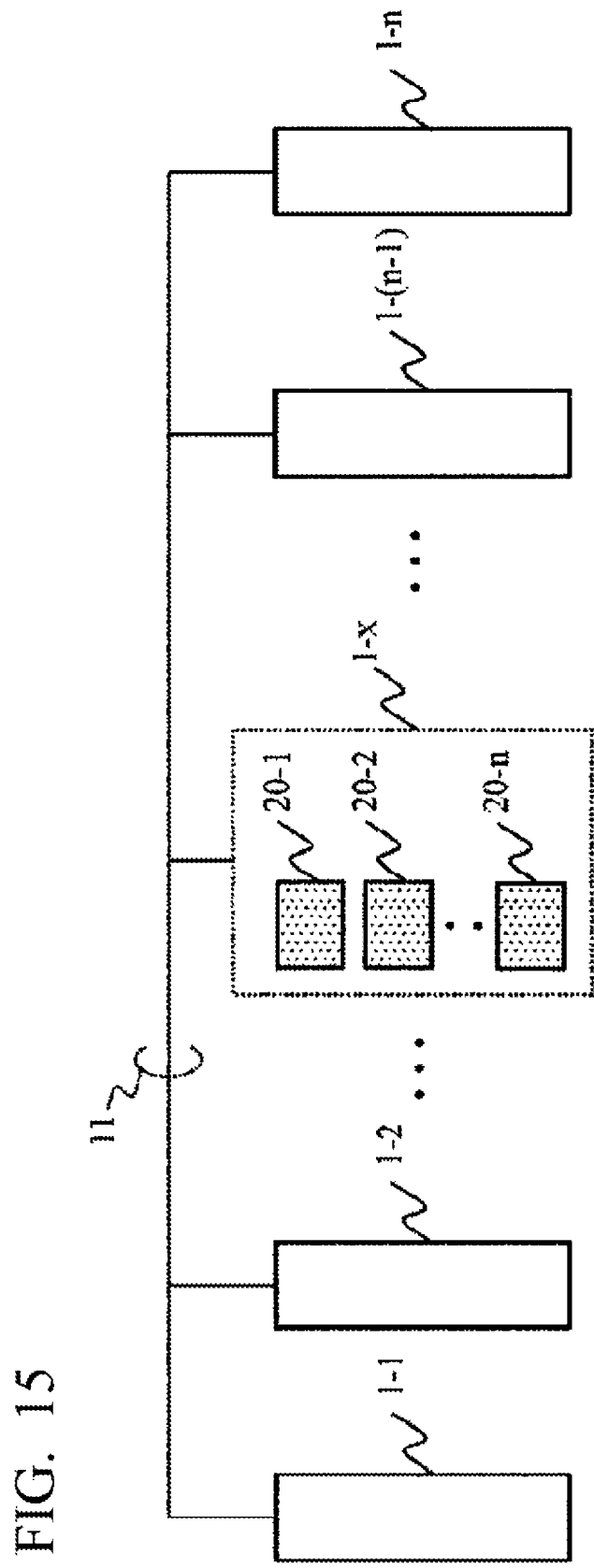
FIG. 15 is a diagram showing yet another example of the rack configuration.

In the above-described embodiment, the description has been given on the premise of a configuration in which the ToR switch is installed in each rack as shown in FIG. 1. However, the present invention is not limited to this. For example, as shown in FIG. 14, a rack 1-*x* including electrical switches 20-1 to 20-*n* having functions equivalent to that of a ToR switch may be provided in parallel to racks 1-1 to 1-*n* in which one or more servers or memories and the like are arranged at the ends of racks 1-1 to 1-*n*. The racks 1-1 to 1-*n* are connected to the electrical switches 20-1 to 20-*n* via an electrical link or an optical link 11. This is referred to as an end-of-row configuration. Also, as shown in FIG. 15, a middle-of-row configuration in which the rack 1-*x* is arranged in the middle of the racks 1-1 to 1-*n* may be adopted. In either case, a one-to-one relationship in which the electrical switch 20-1 is responsible for the rack 1-1 and the electrical switch 20-2 is responsible for the rack 1-2 may be formed or one electrical switch 20 may be responsible for one or more racks. Further, a server, a memory, or the like for which each electrical switch 20 is responsible may be set up regardless of the rack.

That is, it is possible to implement the hybrid electrical/optical switch network that enables the above-described low-latency data transfer in cooperation with the switch control unit 5 with respect to the electrical switches 20-1 to 20-*n* each having a function equivalent to that of the ToR switch.

Although the embodiments of the present invention have been described above, the present invention is not limited thereto. For example, the example of the functional configuration of the network control unit is an example and may not correspond to a program module configuration. Also, in relation to the operation sequence, the order of the steps may be changed or a plurality of steps may be executed in parallel as long as the processing result does not change.

Also, a combination of the embodiments and a combination of any technical features in each embodiment are made at any time in accordance with the purpose.

Figure 16:
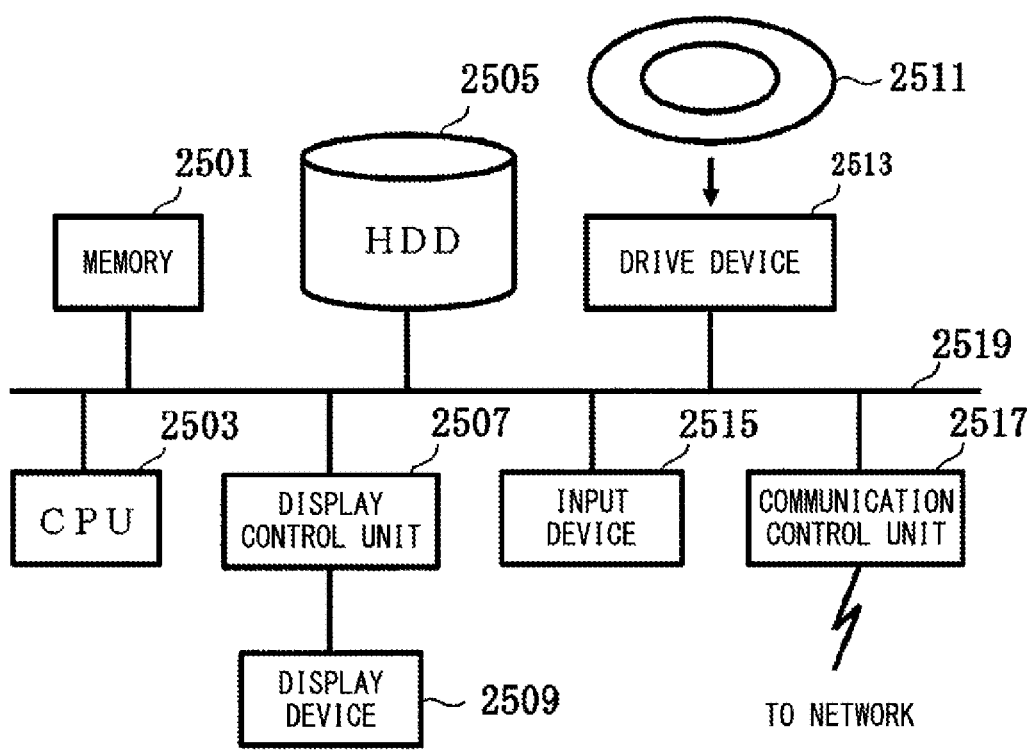
FIG. 16 is a block configuration diagram of a computer device which is a network control unit.

Also, the switch control unit 5 described above is, for example, a computer device. As shown in FIG. 16, a memory 2501, a central processing unit (CPU) 2503, a hard disk drive (HDD) 2505, a display control unit 2507 connected to a display device 2509, a drive device 2513 for a removable disk 2511, an input device 2515, a communication control unit 2517 for connecting to a network, and a peripheral device connection unit 2521 for connecting to peripheral devices (including an image sensor 100, an attenuation mechanism 300, a cooling mechanism 400, and the like) are connected by a bus 2519. Also, the HDD may be a storage device such as a solid state drive (SSD). An operating system (OS) and an application program for carrying out a process according to the embodiment of the present invention are stored in the HDD 2505 and read from the HDD 2505 to the memory 2501 when executed by the CPU 2503. The CPU 2503 controls the display control unit 2507, the communication control unit 2517, and the drive device 2513 in accordance with processing content of the application program such that a prescribed operation is performed. Also, data in the middle of processing is mainly stored in the memory 2501, but may be stored in the HDD 2505. For example, an application program for performing the above-described process is stored in the computer-readable removable disk 2511, distributed, and is installed from the drive device 2513 to the HDD 2505. The application program may be installed in the HDD 2505 via a network such as the Internet and the communication control unit 2517. Such a computer device implements various functions as described above by organically cooperating with the hardware such as the CPU 2503 and the memory 2501 described above and programs such as the OS and the application program.

The switch control unit 5 is not only mounted on one device, but its functions may be distributed and mounted on a plurality of devices. Also, the CPU may be a graphics processing unit (GPU) or a field-programmable gate array (FPGA).

The above-described embodiments can be summarized as follows.

According to the present embodiment, a communication control method of controlling communication between a first electrical switch (the ToR switch or a electrical switch having a function similar to that of the ToR switch) and a second switch connected via an optical network (for example, the optical switch unit 4) and via an electrical network (for example, the electrical switch unit 3) and responsible for one or more devices (for example, an information processing device such as a server, a storage device, and the like) includes (A) determining the presence or absence of blocking in relation to a first setup request of an optical circuit from the first electrical switch to the second electrical switch; and (B) performing, if the blocking is present, at least one process of a first process of transmitting, from the first electrical switch, a second setup request of the optical circuit from the first electrical switch to the second electrical switch and a second process of transmitting a packet or a packet flow related to the first setup request from the first electrical switch via the electrical network.

In this way, it is possible to transfer data with low latency by performing at least one of the first process, i.e., retransmission of the optical circuit setup request, and the second process, i.e., switching to a data transfer via the electrical network, in response to the occurrence of the blocking.

Also, the determining process may include (a1) a process in which a control unit (for example, the switch control unit 5) that controls communication devices included in the optical network and the electrical network determines the presence or absence of the blocking according to whether or not an input/output port of an optical circuit switch within the optical network for use in the first setup request is already being used. It is possible to detect the blocking using a simple method.

Also, (b1) the second process may be performed promptly (i.e., immediately without retransmitting the optical circuit setup request) if the blocking is present. This is to shorten the transfer latency.

Further, (b2) the first process may be performed if the blocking is present and if a usage rate or a load factor of the electrical network or a usage rate of a link to connect the first electrical switch and the electrical network is greater than or equal to a prescribed reference value. This is to prevent the usage rate of the electrical network from increasing and affecting other communication.

Further, (b3) the second process may be performed if the blocking is present and if the usage rate or the load factor of the electrical network or the usage rate of the link for connecting the first electrical switch and the electrical network is less than the prescribed reference value. If there is no problem in terms of the usage rate of the electrical network and the like, the electrical network is used to shorten the transfer latency.

Further, (b4) the second process may be performed after the first process is executed a prescribed number of times if the blocking is present. On the other hand, (b5) the second process may be performed after the first process may be performed a plurality of times if the blocking is present and a prescribed period of time has elapsed from initial blocking detection. The probability that blocking will continue to occur is low, but the data transfer is switched to a data transfer via the electrical network if blocking detection continues.

Also, the above-described control unit (for example, the switch control unit 5) may manage a table that manages at least connection available and connection unavailable with respect to combinations of input ports and output ports of the optical circuit switch. Thereby, it is possible to confirm the occurrence of blocking at a high speed.

Also, a third network through which a control unit that controls communication devices included in the optical network and the electrical network transmits a control signal may be configured to be further connected between the first electrical switch and the second electrical switch. In this case, the process of performing the at least one process may be a process of performing at least one process of the first process, the second process, and a third process of transmitting a packet or a packet flow related to the first setup request from the first electrical switch via the third network. The third network is effectively utilized.

According to the present embodiment, a communication control apparatus (for example, the switch control unit) for controlling communication between a first electrical switch and a second electrical switch each connected via an optical network and via an electrical network and each responsible for one or more devices determines the presence or absence of blocking in relation to a first setup request of an optical circuit from the first electrical switch to the second electrical switch and performs, if the blocking is present, at least one of a first process of transmitting a request for retransmitting the first setup request to the first electrical switch and a second process for initiating communication via the electrical network from the first electrical switch to the second electrical switch.

When the communication control apparatus performs this process in performing the above-described communication control method, data can be transferred with low latency in the hybrid electrical/optical switch network. Also, for blocking detection, a table that manages at least connection available and connection unavailable with respect to combinations of input ports and output ports of an optical circuit switch may be used.

Also, the second process may be performed promptly if the blocking is present. Also, the first process may be performed if the blocking is present and if a usage rate or a load factor of the electrical network or a usage rate of a link to connect the first electrical switch and the electrical network is greater than or equal to a prescribed reference value, and the second process may be performed if the usage rate or the load factor of the electrical network or the usage rate of the link to connect the first electrical switch and the electrical network is less than the prescribed reference value.

Further, the second process may be performed after the first process is performed a prescribed number of times if the blocking is present or after the first process is performed a plurality of times if the blocking is present and a prescribed period of time has elapsed from initial blocking detection.

It is possible to create a program for causing a processor to execute a process of the communication control apparatus and the program is stored in various storage media.

The invention claimed is:

1. A communication control method of controlling communication between a first electrical switch and a second electrical switch, the communication control method comprising:
   determining the presence or absence of blocking in relation to a first setup request of an optical circuit from the first electrical switch to the second electrical switch, wherein each of the first electrical switch and the second electrical switch are connected via an optical network and via an electrical network and is responsible for one or more devices; and
   performing, if the blocking is present, at least one process of a first process of transmitting, from the first electrical switch, a second setup request of the optical circuit from the first electrical switch to the second electrical switch and a second process of transmitting a packet or a packet flow related to the first setup request from the first electrical switch via the electrical network.

2. The communication control method according to claim 1, wherein the determining process includes a process in which a controller that controls communication devices included in the optical network and the electrical network determines the presence or absence of the blocking according to whether or not an input/output port of an optical circuit switch within the optical network for use in the first setup request is already being used.

3. The communication control method according to claim 1, wherein the second process is performed promptly if the blocking is present.

4. The communication control method according to claim 1, wherein the first process is performed if the blocking is present and if a usage rate or a load factor of the electrical network or a usage rate of a link to connect the first electrical switch and the electrical network is greater than or equal to a prescribed reference value.

5. The communication control method according to claim 4, wherein the second process is performed if the blocking is present and if the usage rate or the load factor of the electrical network or the usage rate of the link for connecting the first electrical switch and the electrical network is less than the prescribed reference value.

6. The communication control method according to claim 1, wherein the second process is performed after the first process is executed a prescribed number of times if the blocking is present.

7. The communication control method according to claim 1, wherein the second process is performed after the first process is performed a plurality of times if the blocking is present and a prescribed period of time has elapsed from initial blocking detection.

8. The communication control method according to claim 2, wherein the controller manages a table that manages at least connection available and connection unavailable with respect to combinations of input ports and output ports of the optical circuit switch.

9. The communication control method according to claim 1,
   wherein a third network through which a controller that controls communication devices included in the optical network and the electrical network transmits a control signal is further connected between the first electrical switch and the second electrical switch, and
   wherein the process of performing the at least one process is a process of performing at least one process of the first process, the second process, and a third process of transmitting a packet or a packet flow related to the first setup request from the first electrical switch via the third network.

10. A communication control apparatus for controlling communication between a first electrical switch and a second electrical, comprising:
    a memory; and
    a processor coupled with the memory and to execute a process comprising,
    determining the presence or absence of blocking in relation to a first setup request of an optical circuit from the first electrical switch to the second electrical switch, wherein each of the first electrical switch and the second electrical switch are connected via an optical network and via an electrical network and is responsible for one or more devices; and
    performing, if the blocking is present, at least one of a first process of transmitting a request for retransmitting the first setup request to the first electrical switch and a second process for initiating communication via the electrical network from the first electrical switch to the second electrical switch.

11. The communication control apparatus according to claim 10, wherein the second process is performed promptly if the blocking is present.

12. The communication control apparatus according to claim 10,
    wherein the first process is performed if the blocking is present and if a usage rate or a load factor of the electrical network or a usage rate of a link to connect the first electrical switch and the electrical network is greater than or equal to a prescribed reference value, and
    wherein the second process is performed if the usage rate or the load factor of the electrical network or the usage rate of the link to connect the first electrical switch and the electrical network is less than the prescribed reference value.

13. The communication control apparatus according to claim 10, wherein the second process is performed after the first process is performed a prescribed number of times if the blocking is present or after the first process is performed a plurality of times if the blocking is present and a prescribed period of time has elapsed from initial blocking detection.

14. A non-transitory storage medium storing a program for causing a processor of a communication control apparatus, which controls communication between a first electrical switch and a second electrical switch to execute a process comprising:

determining the presence or absence of blocking in relation to a first setup request of an optical circuit from the first electrical switch to the second electrical switch, wherein each of the first electrical switch and the second electrical switch are connected via an optical network and via an electrical network and is responsible for one or more devices; and performing, if the blocking is present, at least one of a first process of transmitting a request for retransmitting the first setup request to the first electrical switch and a second process for initiating communication via the electrical network from the first electrical switch to the second electrical switch.

\* \* \* \* \*